JOHN W. ERICKSON,
INVENTOR.

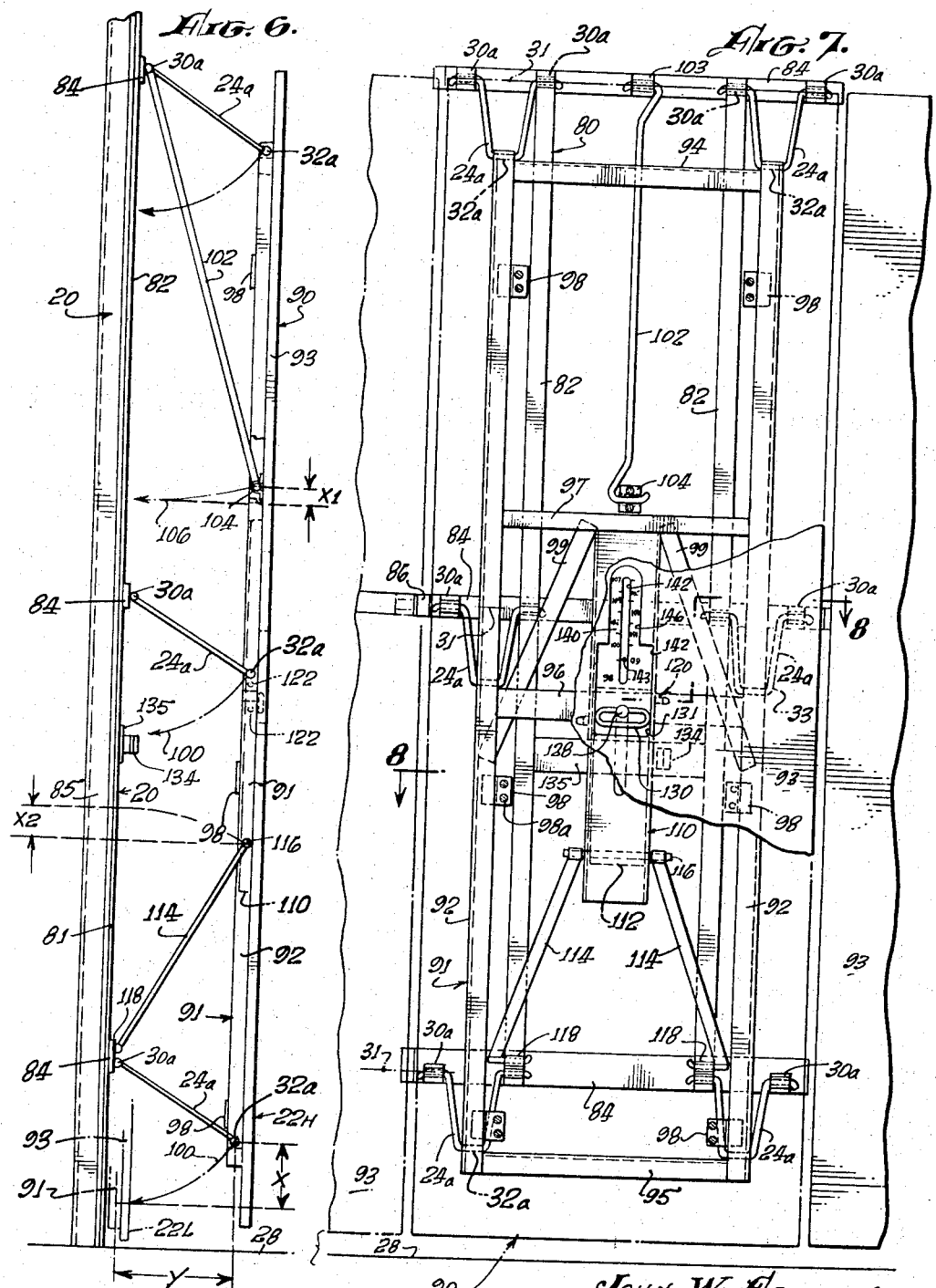

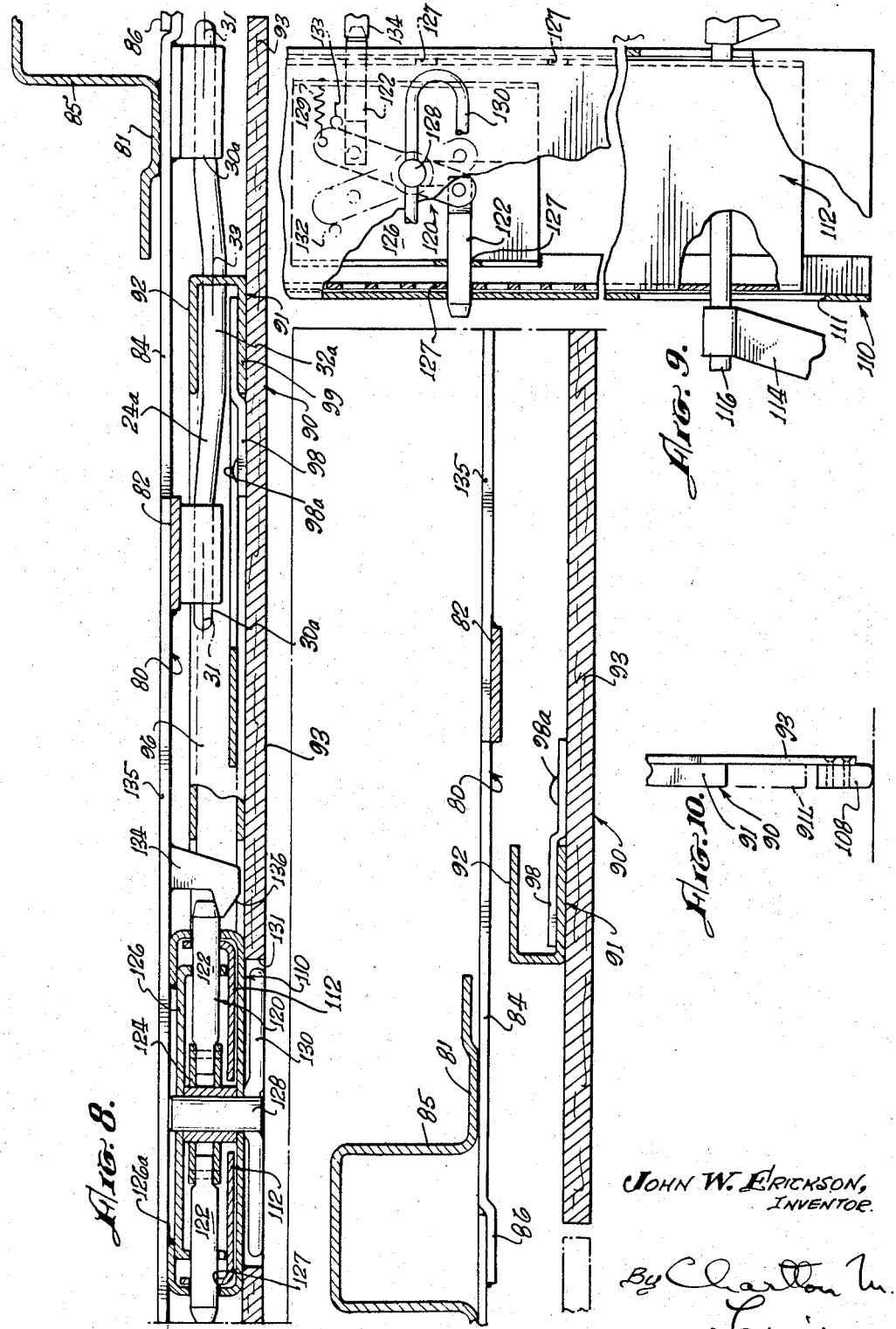

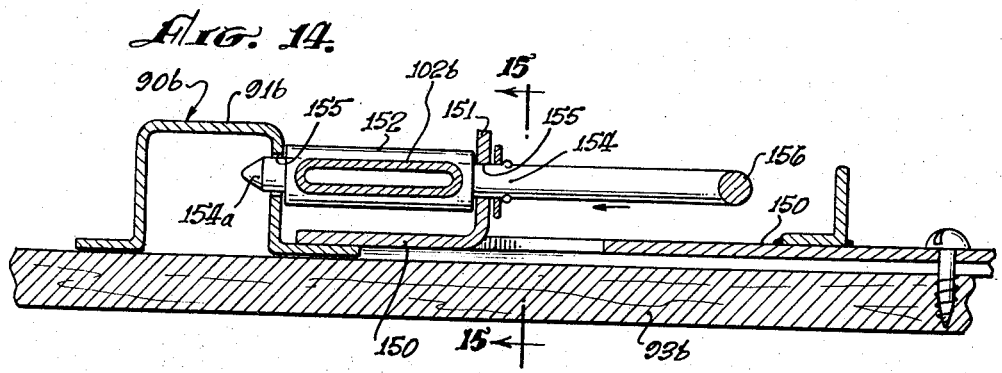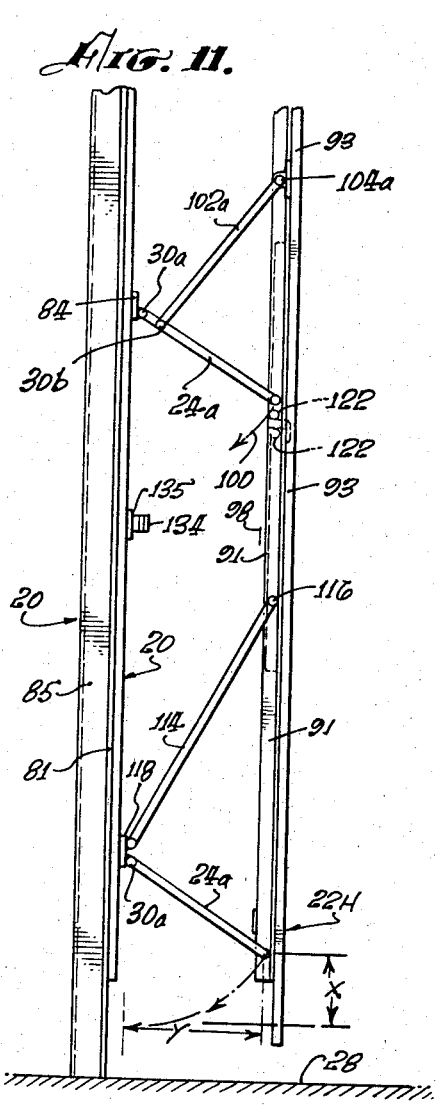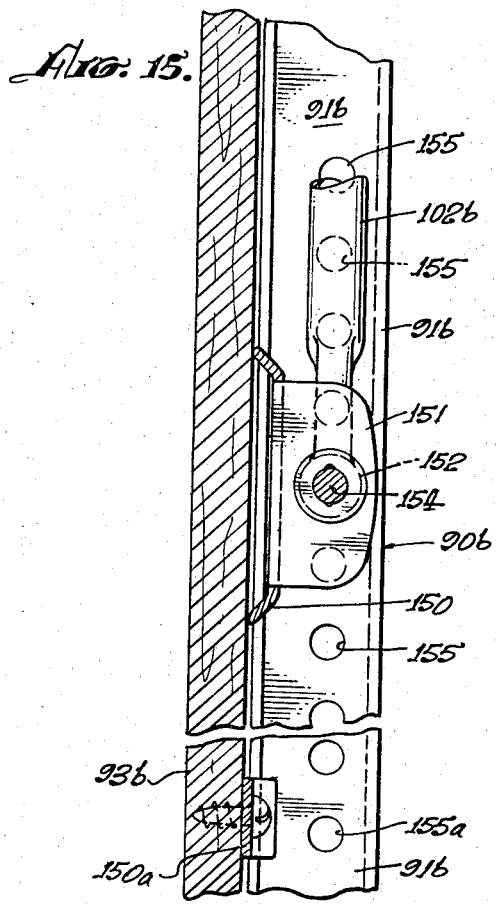

Oct. 10, 1967 — J. W. ERICKSON — 3,345,955
WALL FILLERS
Filed Jan. 10, 1966 — 6 Sheets-Sheet 6

INVENTOR.
JOHN W. ERICKSON,
By Charlton M. Lewis

United States Patent Office

3,345,955
Patented Oct. 10, 1967

3,345,955
WALL FILLERS
John W. Erickson, Huntington Beach, Calif., assignor to Preco Incorporated, Los Angeles, Calif., a corporation of California
Filed Jan. 10, 1966, Ser. No. 519,555
15 Claims. (Cl. 105—369)

The present application is a continuation-in-part of my co-pending application Ser. No. 389,517, filed Aug. 10, 1964, now abandoned, which application is a continuation-in-part of my previously filed application Ser. No. 332,661, filed Dec. 23, 1963, now abandoned, both under the same title.

This invention relates to wall fillers for cargo carriers such as freight cars or vans of the truck or trailer varieties. The general purpose of a wall filler is to stabilize a cargo that does not fill a carrier interior from wall to wall, to hold the cargo against loose movement between the walls. Although wall fillers may be used at the end walls of, e.g., a freight car, they are usually used at the side walls to hold the cargo against free lateral movement.

It is a general objective of the present invention to provide a simple form of filler which, mounted on or bearing against a carrier wall, may be easily adjusted to various spacings from that wall to bear against cargoes at various distances from the wall; and which, when once adjusted against the cargo, will securely remain in bearing position in spite of vibrations or shocks incident to travel.

The filler of the invention is characterized by a panel assembly unit, which may be of various forms, linked to the carrier wall by swinging linkages which, as shown illustratively here in FIGS. 1 to 11, on upward movement of the unit, force the panel away from the wall and toward and against the cargo; together with a simple and lockable means for holding the panel assembly up (as shown here) and in its position against the cargo. In the following descriptions and accompanying drawings of one typical and illustrative form of the invention the panel is held up and inward toward and against the cargo by a leg, with a floor contacting foot, vertically slidable relative to the panel and latched in its relatively lowered position by a simple latch which securely holds the foot in panel supporting position but which is easily released when desired. The various positions in which the panel is supported by the effective length of the leg are such that, due to angularity of the linkages in such panel positions, lateral pressure of the cargo on the panel sets up a component force tending to force the panel down, such downward movement being prohibited by the leg support.

In a further illustrative form of the invention, the panel assembly unit is prevented from moving downward in translation, along the arcuate path defined by the linkages, by an elongated structure that extends from the car wall obliquely upward to the panel assembly. The effective length of that structure is variable to control the panel position. That defining structure typically comprises a strut having its lower end pivoted on the car wall on a fixed horizontal pivot axis, while its upper end is pivoted on a horizontal axis on a member that is vertically slidable on the panel assembly. Releasable latch means are provided for locking the vertical movement of the pivot-carrying member relative to the panel assembly to define the effective vertical length of the strut mechanism. The latch thus secures the panel at the desired distance from the car wall.

Due to the nature of the primary linkage support of the panel assembly unit from the wall, the arcuate movement of the supporting linkage has components both parallel to and perpendicular to the wall. In the first form of the invention panel movement due to cargo pressure is limited by limitation if one of those movement components, e.g., in this illustration, vertical. In the second form of the invention, panel movement is limited by limiting also both movement components.

A further aspect of the present invention provides a panel assembly unit in the form of a rigid, generally plane structural frame linkage mounted in the manner already described and carrying no its front face a panel facing or panel proper that is slidable vertically relative to the panel frame. The sliding movement of the panel proper relative to the frame is defined in such a way that, as the frame swings upward away from the wall along the arcuate path defined by the connecting linkages, the panel member remains at a constant, or approximately constant, distance from the floor. That may be accomplished, for example, by providing on the panel a floor contacting foot. In preferred form of the invention, the vertical position of the sliding panel member is defined by one or more links of greater length than the frame carrying linkages and extending obliquely between horizontal pivot axes fixed on the wall and on the panel member.

A further aspect of the invention provides latching mechanism for releasably locking the panel unit securely and positively in its idle position closely adjacent the car wall. This may be done by directly locking the movement component that extends perpendicularly to the wall. In one preferred form of the invention, that latching mechanism is operated by the same handle that controls the latch for locking the panel in its selected working position spaced from the wall.

A further aspect of the invention, illustrated in FIGS. 12 and following lies in the provision of locking such a relatively sliding panel proper as shown in FIG. 6, with relation to the main panel unit frame, in various relative positions to lock the panel unit in varied positions against a load and also to lock it against the wall. FIGS. 12 and following also illustrate the various general orientations of the devices here described, that varying orientation being hereinafter spoken of. With regard to such a panel unit locking arrangement such as shown in FIGS. 12 and following, it will be noted that the relatively sliding panel proper is connected to the carrier structure, here the car wall; so that the arrangement for locking the panel unit in a selected position is one that connects the panel unit to the car structure. This is later pointed out in connection with FIGS. 12 and following.

The following descriptions and accompanying drawings set out typical and illustrative releasable latch forms and other structures; and the panel unit and its mounting linkages may also be, as indicated in the following, varied in size or form within the invention.

For the purpose of detailed description of typical and illustrative embodiments of the invention, reference is had to the accompanying drawings, wherein:

FIGS. 2 and 3 showing an illustrative form of latch and manual release;

FIG. 4 is an enlarged section on line 4—4 of FIG. 2;

FIG. 5 is an enlarged detail section on line 5—5 of FIG. 2;

FIG. 6 is a section corresponding generally to FIG. 1, but showing another embodiment of the invention;

FIG. 7 is an elevation with portions cut away;

FIG. 8 is a section on the line 8—8 of FIG. 7, showing the wall filler in stowed position;

FIG. 9 is a detail partially cut away corresponding to a portion of FIG. 7 at enlarged scale;

FIG. 10 is a fragmentary section corresponding to a portion of FIG. 6 and showing a modification;

FIG. 11 shows a variation of the form shown in FIG. 6;

FIG. 14 is an enlarged section on line 14—14 of FIG. 12; and

FIG. 15 is a section on line 15—15 of FIG. 14.

Figure 1:
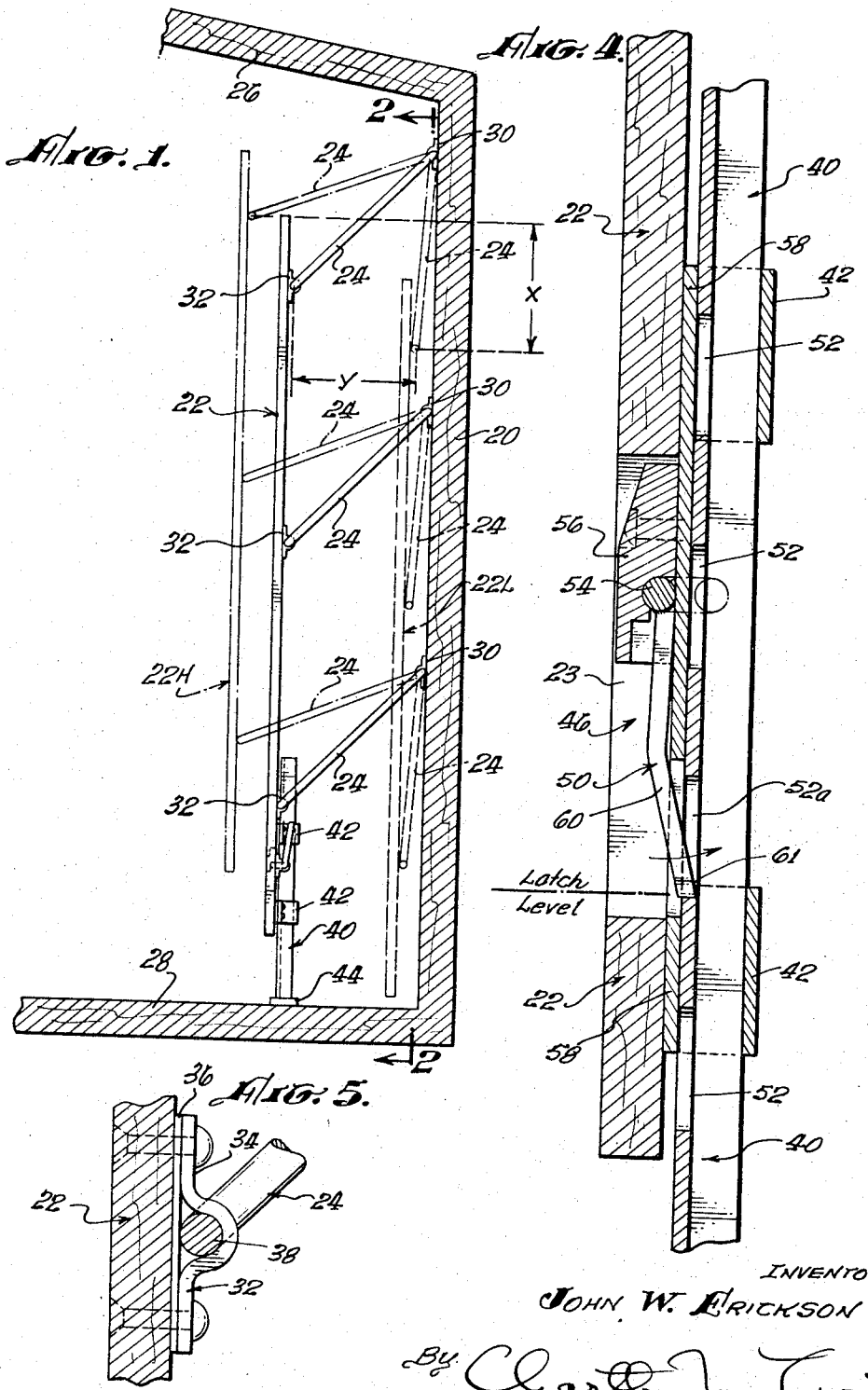
FIG. 1 is a schematic in the nature of a transverse vertical section across an illustrative freight car, showing a filler of the present invention installed against a car sidewall.

In the present illustrative designs, the member here called the panel or panel assembly unit, shown in FIGS. 1 to 5 as a substantially solid piece of plyboard about forty inches wide, may be of any suitable width and height. It may, for instance, be just a narrow slat, or made up of a structure of framed spaced narrow slats. As shown here, its width and height are suitable for a standard freight car side wall and most cargoes. And as here shown, the panel may be simply a fairly thick piece of ply-board; but it may also be composed of a thinner piece reinforced with, e.g., metal angles. Whether of one piece, as shown, or framed, the panel is hereinafter referred to generally as the panel unit. In FIG. 1 a side wall of a freight car is indicated at 20, with panel 22 mounted on it by a plurality of vertically swinging linkages 24. Full lines show the panel in an adjusted intermediate spacing from wall 20. In the highest position of the panel furthest from wall 20, such as indicated at 22H, the panel upper edge has clearance under the roof structure 26, and in its lowest position against wall 20, such as indicated at 22L, the panel preferably still has some clearance over the floor 28. Those two such positions are indicated in FIG. 1 in broken lines, the latter position being indicated, for clarity of illustration here, as being close to wall 20. It will be understood however that in its wall position linkages 24 may be in substantially vertical positions against the side wall with the panel against the linkages.

It will be understood that a number of such panels may be mounted side by side on, e.g., the side wall of a freight car; as many as are necessary to cover the whole or any desired part of a car side wall. As indicated above, the panel widths and panel make-up may vary to suit different kinds of cargo or cargoes.

Linkages 24, pivotally mounted at one end on side wall 20 at hinges 30 and at their other ends on the panel at hinges 32, swing relative to both wall and panel in vertical planes. The linkages being all of the same length, and the vertical spacings of panel hinges 32 being the same as those of wall hinges 30, the linkages maintain mutual parallelism in their various swung positions, and consequently maintain panel 22 in its various positions parallel to wall 20.

In this illustrative showing, panel supporting links 24 extend obliquely downward and inward from wall 20. In swinging down from panel position 22H to position 22L, the arcuate movement of the link ends and panel has a vertical downward component indicated by $x$ on FIG. 1, and an outward (toward the wall) component indicated by $y$. The following described leg of adjustable effective length limits that downward component $x$ and consequently the component $y$ toward the wall.

Figure 2:
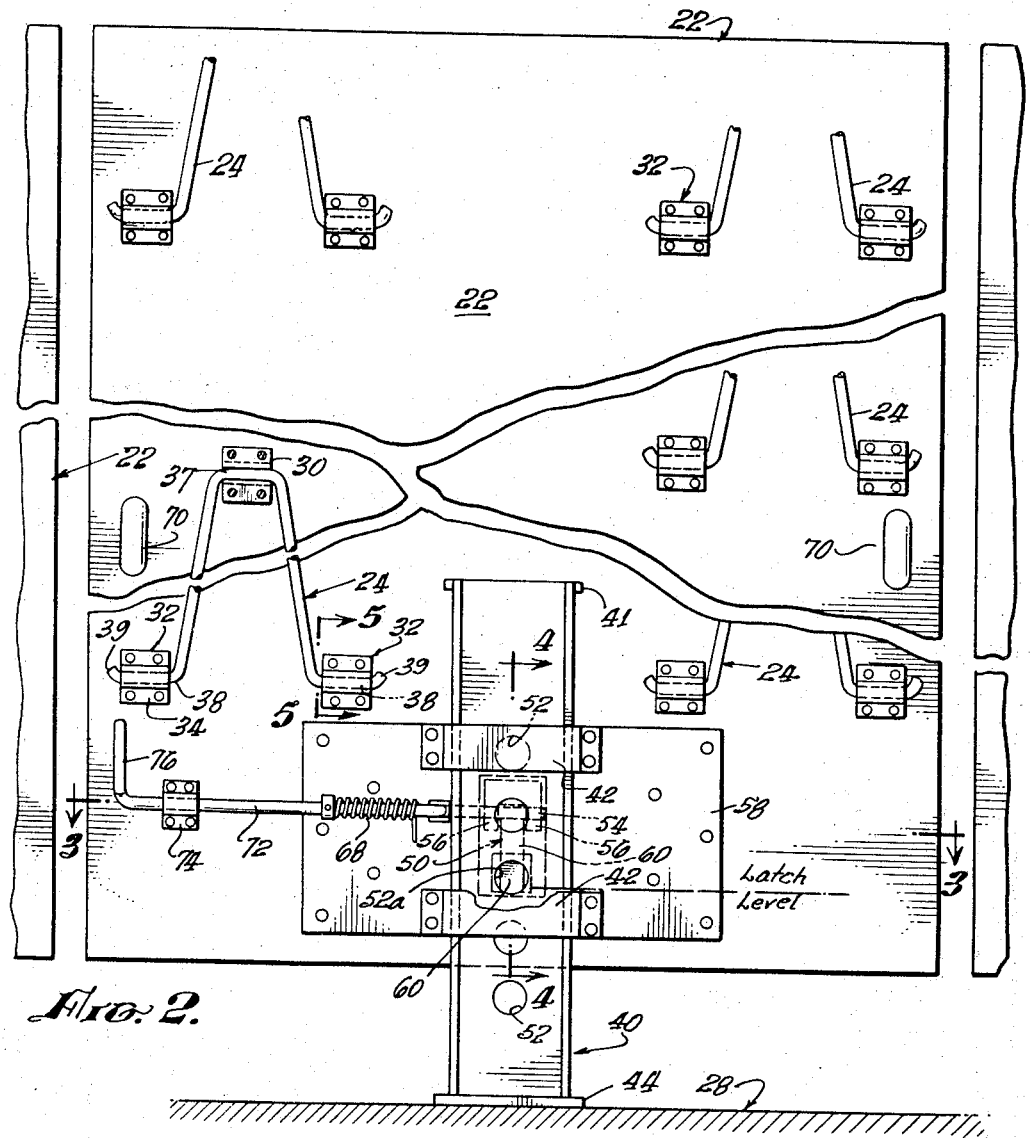
FIG. 2 is a more or less schematic vertical sectional elevation taken as indicated by line 2—2 on FIG. 1 and showing what will here be called the back side of a filler panel and its mounting.
Figure 3:
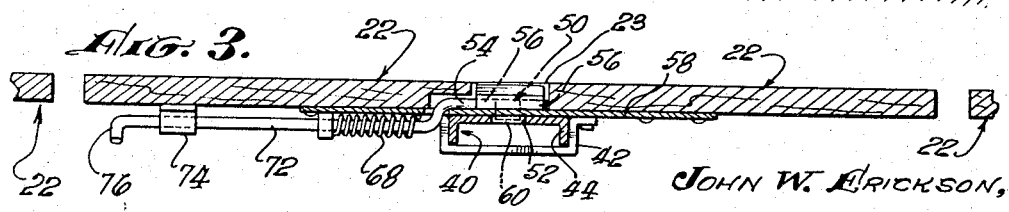
FIG. 3 is a section on line 3—3 of FIG. 2.

A leg 40 with a floor contacting foot 44 adjustably supports panel 22 at various heights above floor 28. Leg 40 slides vertically on the panel in guides 42 and is latched in position on the panel by a panel-carried latch located at 46 at the leg engaging elevation shown by the line labeled "latch level." The latch, as illustrated in FIGS. 2, 3 and 4, engages selectively in a series of vertically spaced openings 52 in leg 40, those openings being relatively located to hold the panel supported in various positions above the floor. In all such various supported positions of the panel linkages 24 extend downwardly, or downwardly and inwardly away from wall 20. In the lowest panel position substantially against wall 20, indicated in FIG. 1 in broken lines at 22L, the linkages extend substantially downwardly from their wall hinges 30. In all other panel positions between position 22L and its highest supported position, indicated as being about the position shown in broken lines at 22H, linkages 24 extend inwardly (away from the wall) and downwardly from wall hinges 30 to panel hinges 32.

As will be more completely understood from FIGS. 1 and 2 the location of the highest latching opening 52 on leg 40 is such as to latch the leg in position to support panel 22 at such a highest position as 22H where linkages 24 are still angled inwardly and downwardly. Although the panel may be raised higher than such a position as 22H, it cannot be supported by leg 40 any higher. While, as will appear, the latch might engage over the upper end of leg 40, some suitable stop for upward panel movement to prevent its being lifted much above position 22H may be used. For instance the panel's upper edge may engage the ceiling structure before the latch can engage over the leg's upper end; or the leg may be lifted with the panel by such a stop as shown at 41 before the leg drops to a position where the latch could engage over its upper end. In all the leg supported positions of the panel, the downward angularity of the linkages causes any lateral cargo pressure on the panel to set up a downward component against which the panel is supported by the floor contacting leg.

Linkages 24 in the present illustrative design are approximately twenty inches long from their wall hinges 30 to their panel hinges 32. The wall and panel hinges are in the form of hinge straps 34 (FIG. 5) riveted or otherwise secured to the panel and wall with a wear plate 36 under them. Each linkage 24 is in the general form of a U (FIG. 2) the central portion 37 being hinged at a wall hinge 30, and the ends of the U-form having pivotal extensions 38 engaging in horizontally spaced hinges 32 on the panel. Portions 38 have bent ends 39 which prevent their accidental removal from their hinges. Each panel 22 is here shown as carried on six such vertically swinging linkages, arranged in horizontally spaced pairs which are vertically spaced. As will be seen in FIGS. 1 and 2 the linkages are swingingly mounted in wall and panel hinges 30 and 32 to swing in those hinges on parallel horizontal axes, and, as seen in FIG. 2, the hinging on those parallel axes and the relations of the linkage U-lengths to the hinge straps prevents or closely limits movement of the panel horizontally in its own plane.

Leg 40, slidably mounted in guides 42 against a plate 58 secured on the panel, has the floor contacting foot 44. The leg has the several vertically spaced latch engageable openings 52. Latch 50, as shown in FIGS. 2, 3 and 4, is pivoted at 54 on pivot lugs 56 attached to plate 58 secured to the outer face of panel 22.

As shown more particularly in FIG. 4, latch 50 has a latching arm 60 extending downwardly from its pivot 54 in block 56. Pivot 54 is spaced inwardly from the perforated web of leg 40 by at least the thickness of plate 58. Latch arm 60 is bent toward the leg so that its lower end 61 will enter a leg opening such as 52a. The point of leg engagement by the arm end is thus offset horizontally toward the leg from a vertical line through pivot 54. Consequently, without any necessity of beveling the lower edges of the leg holes, relative upward pressure by the leg on the latch to support the panel causes the latch to stay in engagement with the lower hole edge. Thus the leg holes may be formed by a simple punching operation. A spring 68 (FIG. 3) urges the latch in the direction indicated to leg engaging position and its bent formation allows the latch to ride over the leg holes when the panel is lifted relative to the leg. Hand holes such as 70 in the panel facilitates panel lifting. As shown in FIG. 4, the latch is entirely located in the panel opening 23 outside the inner load contacting panel face.

As shown in FIGS. 2 and 3, latch pivot 54 is extended, by bending, across the back side of the panel in the form of a shaft 72 journalled near its outer end, preferably somewhat loosely, in a member 74 attached to the back side of the panel. At its end, close to the panel edge, shaft 72 has a bent handle 76 that, in the latch position of FIG. 4, extends upwardly close to the panel. Latch pivot 54 and shaft 72 are rigid relative to latch arm 60. The spring 68 urges shaft 72 and latch arm 60 to the leg engaging position of FIG. 4. Manual swinging of the handle 76 through a small angle away from the panel throws latch arm 60 to the left in FIG. 4 out of leg engagement.

FIGS. 2 and 4 show the latch engaging in a leg hole 52a to hold the panel supported in such a relative position as shown in full lines in FIG. 1. Latch engagement in the uppermost leg hole 52 will hold the panel up to such an uppermost position as 22H in FIG. 1. Latch engagement in the uppermost leg hole 52 will hold the panel up to such an uppermost position as 22H in FIG. 1. Latch engagement with leg holes below 52a will hold the panel in positions intermediate 22L and its medial position. As mentioned before a stop, such as shown at 41 on the upper end of the leg may engage the upper leg-guide 42 to prevent the leg dropping far enough down relative to the panel that the latch might engage over the leg's upper end and hold the panel up in a position substantially above that shown at 22H.

In the embodiment of the invention shown in FIGS. 6 to 9, the linkages 24a are swingably mounted in generally inclined position with their upper ends pivoted by hinge structures 30a on the car wall 20 and with their lower ends pivoted by hinge structures 32a on the panel assembly unit 90. Wall hinges 30a are mounted on a rigid subframe, indicated generally at 80 and comprising typically the two vertical members 82 and the three horizontal members 84. Frame 80 is fixedly mounted on the car wall, typically by welding its horizontal members 84 to the vertical side posts 85 of the car where those respective members cross, as indicated in FIG. 8 at 81. Horizontal members 84 are vertically spaced to correspond to the vertical spacing of the respective sets of linkages 24a, and directly carry hinges 30a on the axes indicated at 31. As illustrated, the linkages 24a are of U-form, but are inverted relatively to the generally similar linkages 24 of the previously described embodiment, so that each linkage element has two upper hinges 30a on frame 80 and only a single lower hinge structure 32a. The horizontal spacing of the linkages is preferably such that one of the upper hinges 30a falls directly over a car side post 85, and the other directly over a vertical member 82 of frame 80, thus providing a strong mounting for both hinges with remarkably simple structure.

Horizontal frame members 84 of each pair of adjacent panel units in the car are arranged to overlap, as shown at 86 in FIG. 8. When the subframes 80 are mounted in the car they are securely welded together at that overlap, strengthening the entire assembly.

Panel assembly unit 90 comprises the generally plane rectangular frame structure 91 and the panel proper 93, which is mounted on frame 91 constrained for relatively vertical sliding movement. Frame 91 comprises the two vertical members 92, the top and bottom horizontal members 94 and 95, and the intermediate horixontal members 96 and 97, member 97 being spaced above member 96. All of those members are typically of channel form with their flanges parallel to the plane of the frame. The webs of vertical channel members 92 are typically bored and may be reinforced as desired to form hinge pivots 32a for linkages 24a on the horizontal axes indicated at 31 (FIG. 8). Horizontal members 94, 95 and 96 are then preferably positioned immediately below those pivot axes, where they strengthen the hinge structures. Diagonal braces are shown illustratively at 99.

Linkages 24a are all of equal linkage lengths, and are arranged in mutually parallel relation, as already described for linkages 24 of the previous embodiment. Swinging of the linkages 24a thus maintains frame 91 always parallel to the car wall, while permitting it to move in translation along an arcuate path as indicated schematically at 100 in FIG. 6. That movement corresponds to the described movement of panel 22 of the previous form.

However, in the present embodiment, panel proper 93 is constrained to a different movement. Panel 93 is slidably mounted on frame 91 by means of the brackets 98. Those brackets are fixedly mounted on the panel, as by the bolts 98a, and fittingly overlap adjacent flanges of vertical members 92 on frame 91, which thus guide the panel movement. Any desired number of brackets 98 may be employed, so distributed as to permit the required vertical sliding movement of panel 93 relative to frame 91. In the present embodiment, the vertical position of the panel, and hence its movement relative to frame 91, is defined by the auxiliary link 102. Link 102 extends obliquely between the car wall and the panel proper, its upper end being typically pivoted on upper cross member 84 of wall frame 80 by the hinge structure 103, and its lower end being pivoted directly on the sliding panel 93 by the hinge structure 104. Link 102 is long compared to the main linkage 24a, that is to say, at least about twice as long as the latter. As illustratively shown, link 102 is approximately three times the length of main linkages 24a.

Swinging of link 102 causes panel proper 93 to move in translation along an arcuate path, indicated schematically at 106 in FIG. 6, having a radius of curvature large compared to the corresponding path 100 of unit frame 91. The component of the panel movement parallel to the car wall is therefore small compared to the corresponding component of the frame 91 movement. Hence, as panel assembly 90 is moved away from the wall, for example, the panel proper 93 moves upward less than does unit frame 91, and may be said to move essentially horizontally away from the wall. That action is shown most clearly by comparing the distance from the floor to the lower edges of the unit frame and of the panel proper in the various positions indicated in FIG. 6. When the panel assembly is in stowed or idle position adjacent wall 20, as indicated in dot-dash lines at 22L, both the panel proper and the frame are typically close to floor 28, though their spacings need not be equal. In fully raised position 22H, on the other hand, frame 91 is typically of the order of 8 to 10 inches above the floor, but the lower edge of panel 93 is still relatively close to the floor, typically 2 or 3 inches. For all practical purposes, the panel proper movement may be considered horizontal, despite the pronounced arcuate movement of the panel frame 91 that is characteristic of the present simple and rugged type of mounting linkage structure.

An alternative mechanism for controlling the vertical movement of the panel proper is shown somewhat schematically in FIG. 10. The floor contacting foot structure 108 is fixedly mounted on the lower edge portion of panel 93 and is adapted to slide over the floor as the panel assembly unit is moved toward or away from the wall. That foot defines the height of the panel from the floor, causing the panel movement to be strictly parallel to the floor. The lower edge of frame 91 is then designed to be clear of foot structure 108 when in its lowest, or stowed, position, as indicated at 91L.

In the embodiment of FIGS. 6 to 10 the panel assembly unit is locked at the selected distance from the car structure by a strut and latch structure that acts directly between the panel assembly unit 90 and the car wall, rather than between that assembly and the floor as in the previously described embodiment. That latch structure (FIGS. 8 and 9) comprises vertical guide means in the form of the double channel member 110, fixedly mounted on panel frame 91 by welding to cross members 96 and 97; the slide member 112 of shallow channel section and freely slidable within guideway 110; and the oblique link or strut 114, which is pivotally mounted at its upper end on slide 112 by means of the horizontal pivot pin 116, and at its lower end on the car wall by means of the hinge structures 118, fixedly mounted on lower cross member 84 of subframe 80. Link 114 in the present structure comprises two distinct link elements disposed symmetrically with respect to the central plane of the panel unit assembly. Vertical movement of link pivot pin 116 is accommodated by the clearance slots 111 in guideway 110. Link 114 between its pivot axes is appreciably longer than the main linkages 24a, typically at least about 1½ times as long, such that the angle formed between the link and the plane of the panel frame 91 is well below the rest angle for slide 112 even in fully extended position of the panel. Inward pressure on the panel then tends to cause slide 112 to move freely upwardly within its guide ways 110. However, such movement of the slide can be prevented at selected positions by engagement of the latch mechanism 120.

The latter mechanism comprises the two latch bolts 122, which are horizontally slidable parallel to the plane of the panel in bores in the webs of member 110 and in the parallel inwardly spaced flanges of the channel bracket member 126. The latter member is welded at 126a (FIG. 8) to guideway 110. The flanges of slide 112 are freely received between the webs of guideway 110 and the flanges of bracket 126, and are bored at 127 to admit the latch bolts at selected vertical positions which correspond to the desired spacings of panel 93 from the car wall. Bolts 122 are controlled in unison by the crank arms 124, fixedly mounted on the shaft 128. That shaft is journaled in guideway member 110 and in the spaced parallel flanges of bracket member 126. The handle 130 (FIGS. 8 and 9) is pivotally mounted in a transverse bore in shaft 128 and is accommodated in idle position in a recess 131 in panel proper 93. That recess is vertically elongated to accommodate the movement of the panel 93 relative to frame 91. For operation of the latch the handle is swung into an axial plane of the shaft 128, and is then rotatable between positions limited by the stops 132 and 133, fixed in member 126. Handle 130 also facilitates manual movement of the entire panel assembly between its several selectable positions. Bolts 122 are yieldingly urged into locking engagement in the holes 127 and the holes in 110 by the coil spring 129. Counterclockwise rotation of handle from the position shown in FIG. 9 withdraws the bolts against the force of spring 129 from members 110 and 112, but leaves the bolt ends guided by bracket member 126. The bolt ends are preferably tapered to facilitate their entrance into a selected pair of holes 127 upon release or clockwise rotation of handle 130 after adjustment of the panel position.

For purposes of claim description, the effective vertical length of the described support structure may be considered to extend from wall pivot 118 (FIG. 6) to the point of slide 112 at which it is latched, or the vertical length from 118 to 116 in the direction of component $x$. That effective length of the support then varies with the distance from the wall at which the panel assembly is latched. It will be understood that support structure for the panel proper of the present general type may be employed, if desired, in place of the foot structure of the previously described embodiment.

Latch mechanism 120 also serves to lock the entire panel assembly in stowed position closely adjacent the car wall. For that purpose the latch member 134 is fixedly mounted, as by welding, on the auxiliary cross member 135 of subframe 80 in position to engage one of the latch bolts 122 when the panel assembly is folded against the wall. Convenient latching action is insured by the oblique camming surface 136 on latch 134 (FIG. 8). Release of the panel from its stowed position requires only the rotation of handle 130, which then provides a firm grip for pulling the panel assembly away from the car wall to the desired working position. It is then locked in that position by rotation of the handle or by action of spring 129 when the handle is released.

In FIG. 6, as in FIG. 1, the vertical component of the panel unit movement on the primary supporting links is indicated by X. The corresponding vertical component of the pivot 116 where the upper end of link 114 is attached to slider 112, is designated in FIG. 6 as X2. And the corresponding vertical component of 104 and of the panel proper 93, controlled by link 102, is designated as X'. Due to the fact that link 102 has an angular extent from the car wall similar to the angular extent of primary mounting links 24a, the relative sliding travel of 104 and of the panel proper 93 is measured by X—X'. But due to the opposite angularity of link 114, relative to that of 24a, the relative movement of 116 and of the slider 112 on the panel frame 91 is measured by X+X². That, for instance, may be as much as twice X. Pivot 116 and the slider 112 are locked to panel frame 91 to lock that frame and the panel unit away from the wall. The increased relative movement of slider 112 on the panel frame increases the accuracy of that locking, by increasing, e.g., the number of locking holes 127 practicable.

Another feature of the locking of the panel unit in FIG. 6 is to be mentioned. The panel lock controlled by the link 114 serves to lock both components $x$ and $y$ of the panel unit. The pivotal point 116 at the panel end of link 114 has in its arcuate movement both a component parallel to component $x$ and also a component parallel to the component $y$. The link 114 thus controls both components $x$ and $y$, or can be said to control either of those components. Controlling either component, it controls, and locks, the distance of the panel unit from the car wall.

And it will be noted that no part of the mounting or locking systems is subjected to any bending stresses. In neither FIGS. 1 to 6 are the primary mounting links 24 or 24a subject to any but longitudinal stresses, compression. In FIG. 1 the panel supporting leg is subject only to longitudinal compression. And in FIG. 6 the locking link 114 is subject only to longitudinal compression.

The selected position of the wall filler assembly is preferably indicated by a suitable scale, which is preferably based on the vertical movement of slide 112 relative to guideway 110. As illustrated, a vertical slot 142 is provided in the front wall of guideway 110 through which an index mark 143 on slide 112 can be seen. Movement of mark 132 is read relative to a scale 140 inscribed directly on guideway 110 and visible through an aperture 146 in front panel proper 93, which may comprise an upward extension of handle recess 131. Scale 140 is preferably calibrated directly in terms of the space available between the inner face of the wall filler and the opposite car wall.

FIG. 11 is a schematic showing a variant arrangement for controlling the relative sliding movement of the panel proper of FIG. 6 on the panel unit frame, and showing a design wherein the linkage controlling relative movement of the panel proper is not entirely independent of the main unit supporting linkage.

In FIG. 11, instead of the panel proper controlling strut 102 of FIG. 6, a strut 102a is shown connected at one end at 104a to the sliding panel proper 93 and at the other end to one of the main supporting links 24a at 30b close to its wall pivot 30a. On downward swinging motion of links 24a, the downward movement of panel proper 93 is increased by the downward movement of pivot 30b. That compensates for the slighter downward movement of the panel proper in FIG. 6 and serves to keep it substantially vertically stationary during movements of the panel frame 91.

It is obvious that, regardless of orientation of the devices, the functions are unchanged. For instance, FIGS. 1 and 6 are specifically described with the pivot spacings— the spacings of the primary link pivots on the car wall and on the panel—as being vertical and with the primary mounting links extending obliquely inwardly and downwardly from the wall. The devices of both figures can obviously be turned upside down. In FIG. 1, the movement limiting leg could bear upwardly on the ceiling structure, and in FIG. 6, seeing that the diagonal limiting strut 114 bears at one end on the car wall, no change at all would have to be made in the device to facilitate its described operation upside down.

Likewise, the functioning of the device of FIG. 6 would remain exactly the same if the whole mechanism were rotated 90° in the plane of FIG. 7. And in FIG. 1, the same rotation would simply involve the leg and foot bearing, e.g., against a car end wall.

In other words, it is immaterial that the primary mounting links extend inwardly and downwardly. Instead of extending obliquely downwardly, they can have that extent in any direction parallel to the wall. The panel movement limiting means, connected substantially directly to the panel unit, takes the panel thrust in that direction of link extent (FIG. 1), or (FIG. 6) in both that direction and the direction of link movement toward the wall. It takes the panel thrust on either of the link movement components parallel or perpendicular to the wall.

Next, we speak of the obvious substitution of tension members, e.g., cables, for the longitudinal compression members such as the leg in FIG. 1 or the diagonal movement limiting links 114 in FIG. 6. Such substitution is obvious from the present designs in which the struts take their thrusts in compression. In FIG. 1, a tension member in the form of a cable or adjustable effective length extending down from the roof structure to the panel is obvious. Similarly, on upside down reversal such a cable could of course extend from the floor to the panel; or, on 90° rotation, from say, an end wall to the panel. And in FIG. 6 all that is necessary to substitute an adjustable length of tension cable for the compression strut 114, is, e.g., to provide such a movement limiting cable in the diagonal position shown for the link 102. In fact that link 102 limits the movement of the panel proper 93. In general, it would only be necessary, in substituting a tension cable for the movement limiting strut 114 of the panel unit, to simply install that cable at an angle opposite to that of 114, as is shown for the movement limiting link 102.

Figure 12:
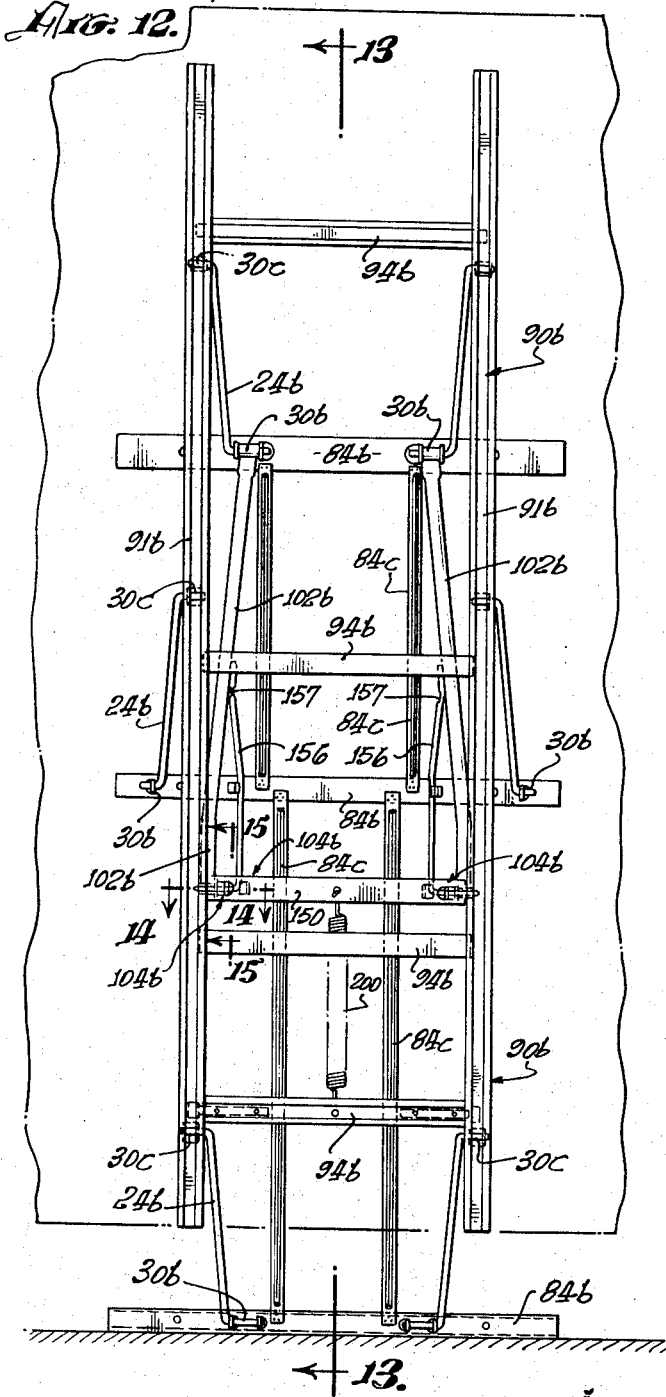
FIG. 12 is an inner face elevation, omitting the sliding panel proper, of a further variation as it appears when locked against the wall.

FIG. 12 and following illustrate, by way of one orientation, reversed in comparison with FIGS. 1 and 6, the fact that the devices here explained may be generally oriented in any direction. And those figures also show another manner in which the panel unit may be locked in any of its positions against the load or against the wall.

Figure 13:
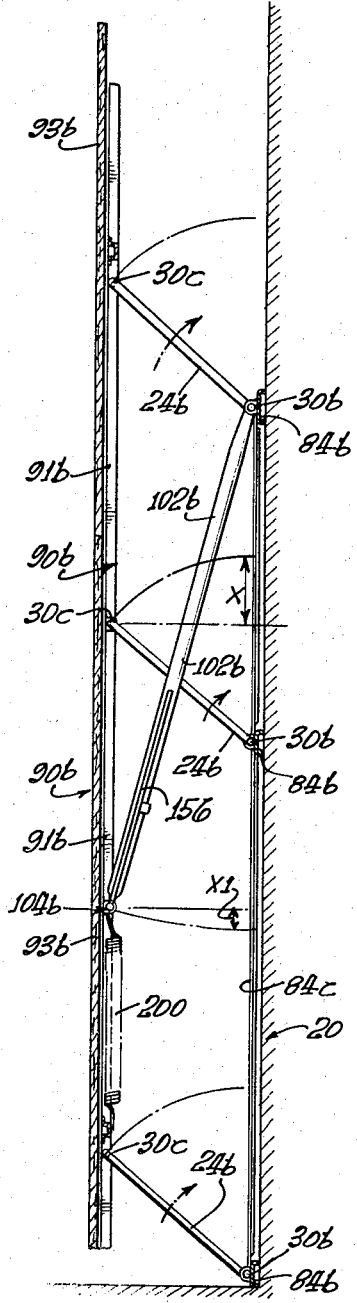
FIG. 13 is a section on line 13—13 of FIG. 2, showing the panel unit in a position spaced from the wall.

FIG. 12 is an inner face view showing the panel unit mounting on the car wall, omitting the sliding panel proper, in the position where it is locked against the car wall; this figure showing a modification of the form shown in FIG. 6; FIG. 13 is a vertical central section taken as indicated by line 13—13 on FIG. 12, but showing the panel unit in a typical position spaced from the wall and bearing against the load. In the form and design shown in FIG. 12 and following the orientation of the device is reversed from that of FIG. 6, and certain modifications are shown particularly with relation to locking the panel unit in positions against the load and against the car wall.

In these figures the fixed framing secured to the car wall is formed by three wall straps 84b, which carry the pivoted wall mountings 30b for the primary mounting links 24b. Straps 84b are interconnected by longitudinals 84c. The other ends of links 24b are pivotally mounted at 30c on the vertical longitudinals 91b of the panel unit frame 90b, which has cross bars 94b unified with the longitudinals 91b. As shown in FIG. 12, two sets of links 24b incline toward each other in their extents toward the wall mountings at 30b, while another set inclines oppositely. All the links are of equal radial lengths about their wall pivots 30b and, as shown in FIG. 13, they extend upwardly from those wall pivots rather than downwardly as in FIGS. 1 and 6.

The sliding panel proper 93b is mounted slidingly on the panel unit frame 90b by being mounted on vertically sliding cross bars 150, one of which is shown in FIG. 12. Panel controlling links 102b extend from one set of wall pivots 30b to pivotal connections at their other ends at 104b with a sliding panel mounting cross bar such as 150. The details of the pivotal mountings at 104b are shown more particularly in FIGS. 14 and 15.

The lower pivoted ends of links 102b carry a tubular slide 152 in which a locking pin 154 slides to enter its end 154a in a series of vertically spaced holes 155 in longitudinal frame members 91b. Tubular slide 152 is confined longitudinally between a flange of frame member 91b and a tab 151 struck up out of sliding cross member 150, and the locking pin 154 slides through that tab as well as through the tubular slide 152 carried at the lower end of link 102b.

Locking pin 154 is carried at the lower end of a spring arm 156 (see FIG. 12) that is mounted at its upper end on a medial part of link 102b and has a flattened springy portion at 157. The spring action at that portion is to press locking pin 154 in the indicated direction to press its end 154a into a frame hole 155.

FIG. 13 shows the panel unit in a typical position spaced from wall 20 for load bearing. If, for instance panel unit 90b is moved down from such a position as shown in FIG. 13 the lower pivoted end of link 102b moves relatively up on the panel unit frame 91b. From any such position, throwing the panel 93b against a load spaced further from wall 20, the locking pins 154 will be positioned to enter an upper hole 155 in panel frame members 91b. During any such movement the locking pins are manually drawn back against the thrust of the springs at 157. Release of 156 allows the locking pins to enter any pair of holes 155 to lock the panel unit frame in any desired spacing from wall 20, including a position against or close to that wall when locking pins 154 are in a position to enter, and enter, a lowermost frame hole 155, such as that shown at 155a.

A tension spring, such as shown at 200 is connected at one end to cross bar 150 that slides with the panel proper 93b and at the other end to such a panel unit frame cross-bar 94b, exerting a downward pull on the panel proper relative to the panel unit frame, or, an upward pull on the panel unit frame. Seeing that vertical movement component X of the frame is greater than the vertical component X1 of the panel proper movement, the spring tends to support the weight of the whole panel unit and facilitates its upward movement to a position against the wall 20. In the arrangement of FIG. 13, the relative vertical movement of the panel proper on the panel unit frame is measured by X plus X1, due to the fact that the angularity of link 102b is opposite to that of the mounting links 24b. The length of 102b determines the vertical movement of 104b and panel proper 93b relative to the car structure.

It will be noted that the functioning of the panel unit limitation is substantially the same as in FIG. 6. Link, or strut 102b, secured at 104b to the panel unit frame takes, in longitudinal compression, the movement component of the panel unit due to cargo pressure against that unit. The only substantial difference between FIG. 13 and FIG. 6 is that in the first named figure a single link, 102b controls the panel proper movement and also limits the movement of the panel unit, whereas in FIG. 6 the additional link 102 controls the relative panel movement which in that case is measured by X minus X1. In FIG. 6, as in FIG. 13, the effective relative movement on the panel unit of 116 or 104b is measured by X plus X2. In FIG. 13, as well as in FIG. 6, the link 102b (FIG. 13) or the link 102a (FIG. 6) may have its pivotal connection 30b or 30a to a main or primary supporting link as shown in, e.g., FIG. 11. By placing that connection close to the wall pivot of the primary link no appreciable bending moment is placed on the primary supporting link.

It is obvious that the elongate movement limiting or locking member may be adjustable in effective length in the direction of the controlled movement component either by having a length adjustment in itself, or by being adjustably attachable or lockable either to the car wall or structure or to the moving panel unit. For instance, in the designs of any of the figures, the effective length of 40 in FIG. 1, of 102 or 114 in FIG. 6, 102a in FIG. 11, or 102b in FIGS. 12 and 13, could be within such members. Or, in any of those designs, the fixed contact or engagement of either end of the elongate movement limiting member may engage either the car structure or the panel unit, while the adjustable, effective-length engagement may be to the other one of those units.

FIGS. 1 and 4 show a ratchet-type lock which takes hold in any position to which the panel unit 22 is pushed against the load. FIGS. 6 to 9, and 12 to 15 show a positive lock between the movement limiting member and the panel unit. But in both those designs the "lock" could be of the ratchet type, holding the panel unit in whatever position it may be pushed against the wall.

In the following claims, "inwardly" means away from the wall, "outer panel face" means the panel face that faces the wall, "inner panel face" means the panel face that faces away from the wall.

I claim:

1. In a cargo engaging wall filler for a cargo carrier, the combination of
   - a carrier structure including at least a wall,
   - a generally plane and essentially rigid frame,
   - a panel having a cargo engaging face and mounted on the frame for movement relative thereto in the plane of the frame,
   - a primary support for said frame, including a plurality of parallel mounting linkages of equal lengths pivotally mounted each at one end on the carrier wall and at their other ends on the frame, said pivotal mountings having parallel swinging axes which, on the carirer wall and on the frame, are spaced apart equal predetermined distances in directions substantially perpendicular to the pivot axes, so that during swinging movement of said linkages the frame is maintained in substantial parallelism to the wall and is moved along an arcuate path between a position closely adjacent the wall and a series of positions spaced from the wall,
   - an elongate link pivotally connected at its effective ends substantially directly with the frame and with the carrier wall and extending freely between said pivotal connections and obliquely with respect to the carrier wall, the axes of said pivotal connections being parallel to the axes of the pivots of the primary mounting linkages so that the swinging movement of said link is in a plane parallel to the swinging plane of said primary mounting linkages,
   - adjustable means for varying the effective length of said link as the frame moves along said arcuate path,
   - releasable lock means for locking said adjustable means to prevent frame movement toward the carrier wall,
   - and means interconnecting the panel and the carrier structure for controlling said relative movement of the panel with respect to the frame to cause the panel to move along a path different from said arcuate path and having less curvature.

2. The combination defined in claim 1, and in which the last mentioned means comprises a second link pivotally mounted at its opposite ends on the said panel and on the carrier wall and having an effective length that is larger than the length between pivots of the primary support linkages.

3. The combination defined in claim 1, and including second lock means releasably engageable to lock the frame at said position adjacent the carrier wall independently of the effective length of said link,
   and single handle means manually movable to a common release position to release both the first said lock means and said second lock means.

4. A cargo engaging wall filler for a walled cargo carrier, comprising, in combination with a carrier structure including a wall,
   - a generally plane and essentially rigid frame,
   - structure mounting the frame on the carrier wall for movement relative thereto along a predetermined path that is generally inclined with respect to a line perpendicular to the wall, between a position adjacent the wall and a plurality of positions spaced from the wall by respective different distances, the plane of the frame being essentially parallel to the wall in all of said positions,
   - a cargo engaging panel member, means mounting the panel member on the frame for movement relative thereto in the plane of the frame,
   - means interconnecting the panel member and the carrier structure for constraining the panel member to follow a path less inclined to said perpendicular line than said frame path in response to said frame movement,
   - and latch means actuable to releasably latch the frame against movement along its said path toward the carrier wall.

5. The combination defined in claim 4 and in which the structure coupled to the panel member includes means coupled to the carrier and wall substantially independent of the frame mounting structure.

6. The combination defined in claim 4, and in which said frame mounting structure constrains the frame movement to make said frame path arcuate with a predetermined radius of curvature,
   and said structure coupled to the panel member constrains the same to make said panel path arcuate with a radius of curvature that is at least about twice the first said radius of curvature.

7. The combination defined in claim 6, and in which said frame mounting structure comprises a plurality of parallel linkages of equal linkage lengths pivotally interengaging the frame and the carrier wall,
   and said structure coupled to the panel member comprises linkage means pivotally interengaging the panel member and the carrier wall and having a linkage length that is longer than the first said linkages.

8. In a cargo-engaging wall filler for a cargo carrier the combination of,
   carrier structure unit including at least a wall,
   a generally plane and essentially rigid panel unit comprising a panel unit frame and a load contacting panel proper mounted on said frame and constrained to move relative thereto along a line in the plane of the frame,
   means mounting said panel unit frame on the wall of the carrier unit for movement to and from said wall along a line of movement inclined to a perpendicular to said wall,
   means for adjustably fixing the position of said panel unit frame relative to said wall, said means embodying an elongate link pivotally attached at its effective ends to the carrier structure unit and to the panel proper and normally extending at an acute angle relative to the wall and non-perpendicular to said line of movement of the panel unit frame,
   and means for adjustably locking said relative movement of the panel proper relative to the panel unit frame.

9. The combination defined in claim 8, and in which the movement locking means comprises:

a longitudinally slidable pin which acts as pivot pin for pivotally attaching an end of said elongate link to the panel proper, a series of holes in the panel frame adapted to receive one end of said pin, resilient means urging the pin in a direction to enter a selected hole, and means for manually retracting the pin from the hole.

10. A cargo engaging wall filler for a walled cargo carrier, comprising in combination with a carrier structure unit that includes a wall, a generally plane and essentially rigid panel unit frame, a primary support for said frame including a plurality of parallel linkages of equal lengths pivotally mounted each at one end on a carrier wall and at their other ends on said frame, said pivotal mountings having parallel swinging horizontal axes which, on the wall and on said frame, are spaced apart equal vertical distances, so that during the swinging movements of said primary support linkages through acute angles relative to the wall toward positions extending parallel to the wall the frame is maintained in substantial parallelism to the wall and is moved in translation along an arcuate path from a position spaced from the wall through a continuous series of positions characterized by decreasing spacings of said unit from the carrier wall, a cargo engaging panel proper mounted on said frame for movement relative thereto in the plane of the frame substantially parallel to the direction of spacing of the primary linkage pivots, and means to controllably lock said frame in selected position spaced from the carrier wall, said means comprising an elongate member of fixed length pivotally attached at one end to said relatively moving panel proper and to said panel unit frame and pivotally attached at its other end to said carrier structure unit, and means for releasably locking one of said attachments at selected positions along a line substantially parallel to said wall.

11. The combination defined in claim 10 and in which the said panel proper is slidably mounted on the panel unit frame, and the said attachment of the elongate member that is locked in selected positions is the attachment to the panel unit frame.

12. The combination defined in claim 11 and including an element mounted on the panel frame for relative sliding movement in the plane of the frame, said panel proper being fixedly connected to said sliding element, pivotal means connecting one end of said elongate member to the wall, pivotal means connecting the other end of said elongate member to said sliding element, and means for fixing said last mentioned pivotal means in said selected positions on the panel frame.

13. The combination defined in claim 12 and in which the last mentioned means involves a locking pin carried on a spring arm that is mounted on said elongate member, said locking pin adapted to enter a selected one of a series of holes in said panel frame.

14. The combination defined in claim 12 and also including a tension spring connected to and acting between said sliding element and the panel frame.

15. The combination defined in claim 10 and in which the last mentioned means comprises a locking pin carried on a spring arm that is mounted on said elongate member, and a series of holes in the panel frame adapted to take said locking pin.

References Cited
UNITED STATES PATENTS

| | | | |
|---|---|---|---|
| 493,111 | 3/1893 | Parsons | 248—409 |
| 1,193,545 | 6/1934 | Campbell et al. | 105—369 |
| 2,162,181 | 6/1939 | Skinner | 248—354 |
| 2,164,662 | 7/1939 | Nampa | 105—368 |
| 2,653,785 | 9/1953 | La Russa | 248—353 |
| 2,786,710 | 3/1957 | Chapman | 296—23 |
| 2,802,429 | 8/1957 | Storch | 105—368 |
| 2,819,810 | 1/1958 | De Witt. | |
| 2,828,804 | 4/1958 | Schwinn. | |
| 2,954,260 | 9/1960 | Wright | 296—23 |
| 2,958,873 | 11/1960 | Ferneau. | |
| 3,003,435 | 10/1961 | Chapman | 105—368 |
| 3,022,037 | 2/1962 | Stallard. | |
| 3,151,572 | 10/1964 | Moorhead et al. | 105—369 |
| 3,212,458 | 10/1965 | Robertson | 105—369 |

ARTHUR L. LA POINT, *Primary Examiner.*

DRAYTON E. HOFFMAN, EUGENE G. BOTZ,
*Examiners.*